United States Patent
Roux

(10) Patent No.: US 11,743,243 B2
(45) Date of Patent: Aug. 29, 2023

(54) POST BILLING SHORT-RANGE COMMUNICATIONS HCE (HOST CARD EMULATION) METHOD AND SYSTEM

(71) Applicant: Conduent Business Services, LLC, Dallas, TX (US)

(72) Inventor: Pascal Roux, Chabeuil (FR)

(73) Assignee: Conduent Business Services, LLC, Florham Park, NJ (US)

( * ) Notice: Subject to any disclaimer, the term of this patent is extended or adjusted under 35 U.S.C. 154(b) by 589 days.

(21) Appl. No.: 15/799,177

(22) Filed: Oct. 31, 2017

(65) Prior Publication Data
US 2019/0132298 A1 May 2, 2019

(51) Int. Cl.
*H04W 12/04* (2021.01)
*G06F 21/73* (2013.01)
(Continued)

(52) U.S. Cl.
CPC ...... *H04L 63/0492* (2013.01); *G06F 12/1408* (2013.01); *G06F 21/44* (2013.01); *G06F 21/73* (2013.01); *H04B 5/0031* (2013.01); *H04B 5/0056* (2013.01); *H04W 12/04* (2013.01); *H04W 12/06* (2013.01); *H04W 12/30* (2021.01);
(Continued)

(58) Field of Classification Search
CPC ............. H04L 63/0492; G06F 12/1408; G06F 2212/1052; G06F 21/44; G06F 21/73; H04B 5/0056; H04B 5/0031; H04W 12/04; H04W 4/80; H04W 12/00503; H04W 12/06; H04W 12/30; H04W 12/63; G06Q 20/36; G06Q 20/3276; G06Q 20/202; G06Q 20/40; G06Q 20/32; G06Q 20/3674

See application file for complete search history.

(56) References Cited

U.S. PATENT DOCUMENTS 9,351,164 B2 * 5/2016 Van Nieuwenhuyze ................... H04W 12/06
9,432,087 B2 * 8/2016 Lee ...................... H04B 5/0031
(Continued)

OTHER PUBLICATIONS

Is Host Card Emulation (HCE) the Big Enabler for Mobile Contactless Payments?, An SPA Position Paper, Dec. 2015, Smart Payment Association, 8 pages.
(Continued)

*Primary Examiner* — Jacob C. Coppola
*Assistant Examiner* — Vincent I Idiake
(74) *Attorney, Agent, or Firm* — Ortiz & Lopez, PLLC; Kermit D. Lopez; Luis M. Ortiz

(57) ABSTRACT

Methods and systems for authenticating a short-range communications HCE (Host Card Emulation) application for mobile communications devices. HCE application data can be transmitted to each registered mobile communications device among a group of mobile communications devices for storage of the HCE application data in a non-volatile memory associated with each registered mobile communications device. The HCE application data include a unique identifier, an expiry date, and an authentication key valid only for a user of each registered mobile communications device. The authentication key can then be diversified by the expiry date and the unique identifier so that the authentication key is only usable for a limited amount of time and the unique identifier is only usable for a single mobile communications device.

17 Claims, 4 Drawing Sheets

(51) Int. Cl.
*H04W 12/06* (2021.01)
*G06F 21/44* (2013.01)
*H04W 12/30* (2021.01)
*H04W 4/80* (2018.01)
*H04L 9/40* (2022.01)
*H04B 5/00* (2006.01)
*G06F 12/14* (2006.01)
*H04W 12/63* (2021.01)

(52) U.S. Cl.
CPC ..... *H04W 12/63* (2021.01); *G06F 2212/1052* (2013.01); *H04W 4/80* (2018.02)

(56) References Cited

U.S. PATENT DOCUMENTS

| | | | |
|---|---|---|---|
| 9,734,091 B2* | 8/2017 | Kadi | H04W 4/80 |
| 10,013,539 B1* | 7/2018 | Hazan | G06F 21/316 |
| 2015/0178724 A1* | 6/2015 | Ngo | H04L 9/0869 |
| | | | 705/71 |
| 2016/0005036 A1 | 1/2016 | Tervo et al. | |
| 2016/0005402 A1 | 1/2016 | Tervo et al. | |
| 2016/0104154 A1 | 4/2016 | Milov et al. | |
| 2016/0127857 A1 | 5/2016 | O'Donoghue et al. | |
| 2016/0381010 A1 | 12/2016 | Bhandari et al. | |
| 2017/0063548 A1 | 3/2017 | Naccache et al. | |
| 2017/0091497 A1 | 3/2017 | Dixit | |
| 2017/0200146 A1 | 7/2017 | Park et al. | |
| 2017/0221047 A1* | 8/2017 | Veerasangappa Kadi | G06Q 20/352 |
| 2017/0228732 A1 | 8/2017 | Badenhorst | |
| 2017/0249622 A1 | 8/2017 | Ortiz et al. | |
| 2017/0257732 A1 | 9/2017 | Kulkarni et al. | |
| 2017/0262749 A1 | 9/2017 | Hammad et al. | |
| 2018/0225653 A1* | 8/2018 | Vokes | H04W 12/06 |
| 2018/0373847 A1* | 12/2018 | Lo | H04L 63/062 |

OTHER PUBLICATIONS

Norman, N., Host card emulation—why it matters, Consult Hyperion, 2 pages.

The Host Card Emulation in Payments: Options for Financial Institutions, HCE Workgroup, Mobey Forum (2014) 25 pages.

Host Card Emulation (HCE), Smart Card Alliance, Mobile & NFC Council, Jun. 18, 2015, 35 pages.

Secure Element Deployment & Host Card Emulation, V1.0, SIMalliance Ltd. (2014), 13 pages.

Pourghami, P. et al., Towards a mobile payment market: A Comparative Analysis of Host Card Emulation and Secure Element, International Journal of Computer Science and Information Security (2015) 13(12):156-164.

Pandy, S. et al., Understanding the Role of Host Card Emulation in Mobile Wallets, Federal Reserve Bank of Boston, May 10, 2016, 7 pages.

* cited by examiner

POST BILLING SHORT-RANGE COMMUNICATIONS HCE (HOST CARD EMULATION) METHOD AND SYSTEM

TECHNICAL FIELD

Embodiments are generally related to the field of short-range communications, such as, for example, NFC (Near Field Communication) and BLE (Bluetooth Low Energy) wireless communications. Embodiments also relate to HCE (Host Card Emulation) devices and systems.

BACKGROUND

Short-range communications such as, for example, NFC (Near Field Communication) and BLE (Bluetooth Low Energy) wireless communication devices, techniques and protocols enable the wireless transmission of data over relatively short distances. NFC technology, for example, enables simple and safe two-way interactions between electronic devices allowing consumers to perform contactless transactions, access digital content, and connect electronic devices with a single touch. NFC complements many popular consumer-level wireless technologies by utilizing the key elements in existing standards for contactless smart card technology. NFC is compatible with existing contactless smart card infrastructures and thus it enables a consumer to utilize one device across different systems.

There are various types of NFC devices, for example, simple NFC tags, stickers, or cards, NFC-enabled mobile devices such as smartphones, and NFC readers integrated in point-of-sale (POS) terminals. An NFC tag or NFC card is usually a passive device, i.e., it does not have its own power source, but instead a field generated by another NFC device, such as an NFC reader, powers it. More complex NFC devices may operate in different modes, specifically: a reader/writer mode, which allows an NFC device to read and/or write passive NFC tags and stickers; a peer-to-peer mode, which allows the NFC device to exchange data with other NFC peer devices; a Host Card Emulation (HCE) mode, which allows the NFC device to act as an NFC card. An external NFC reader, such as an NFC point-of-sale terminal, can access an emulated NFC card. Host Card Emulation (HCE) is the presentation of a virtual and exact representation of a smart card using only software.

An NFC HCE application usually stores a unique identifier and an authentication key so that at each validation, the validator reads and authenticates the HCE application unique identifier, allowing post billing of the trips by the central system at the end of the month. If the HCE application, however, is stolen and used on another mobile phone, the user whose mobile phone was stolen pays for the thief's trips.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved secured short-range wireless communications between electronic devices, including wireless communications devices.

It is another aspect of the disclosed embodiments to provide for methods and systems for authenticating a short-range communications HCE (Host Card Emulation) application for mobile communications devices.

It is another aspect of the disclosed embodiments to provide for application authentication methods and systems involving the use of unique identifiers, expiry dates, and authentication keys.

It is yet another aspect of the disclosed embodiments to provide devices, operations, and techniques for diversifying an authentication key by an expiry date and a unique identifier.

The aforementioned aspects and other objectives and advantages can now be achieved as described herein. Methods and systems are disclosed for authenticating a short-range communications HCE (Host Card Emulation) application for mobile communications devices. In an example embodiment, steps, instructions, or operations can be implemented for transmitting HCE application data to each registered mobile communications device among a plurality of mobile communications devices for storage of the HCE application data in a non-volatile memory associated with each registered mobile communications device. The HCE application data can include, for example, a unique identifier, an expiry date, and an authentication key valid only for a user of each registered mobile communications device.

Additional steps, instructions, or operations include diversifying the authentication key by the expiry date and the unique identifier so that the authentication key is only usable for a limited amount of time and the unique identifier is only usable for a single mobile communications device, thereby preventing the creation of a fake HCE application, and automatically limiting the life of a stolen application to the expiry date. The aforementioned short-range communications can be, for example, NFC (Near Field Communication), BLE (Bluetooth Low Energy) wireless communications, and so on.

In some example embodiments, a central system can be provided, which is responsible for renewing expiry dates and diversified authentication keys and also which receives at least one transaction with a same application unique identifier originating from at least two mobile communications devices among the plurality of communications devices, the unique identifier is transmitted in a hot list at regular intervals to all validators among a plurality of validators.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
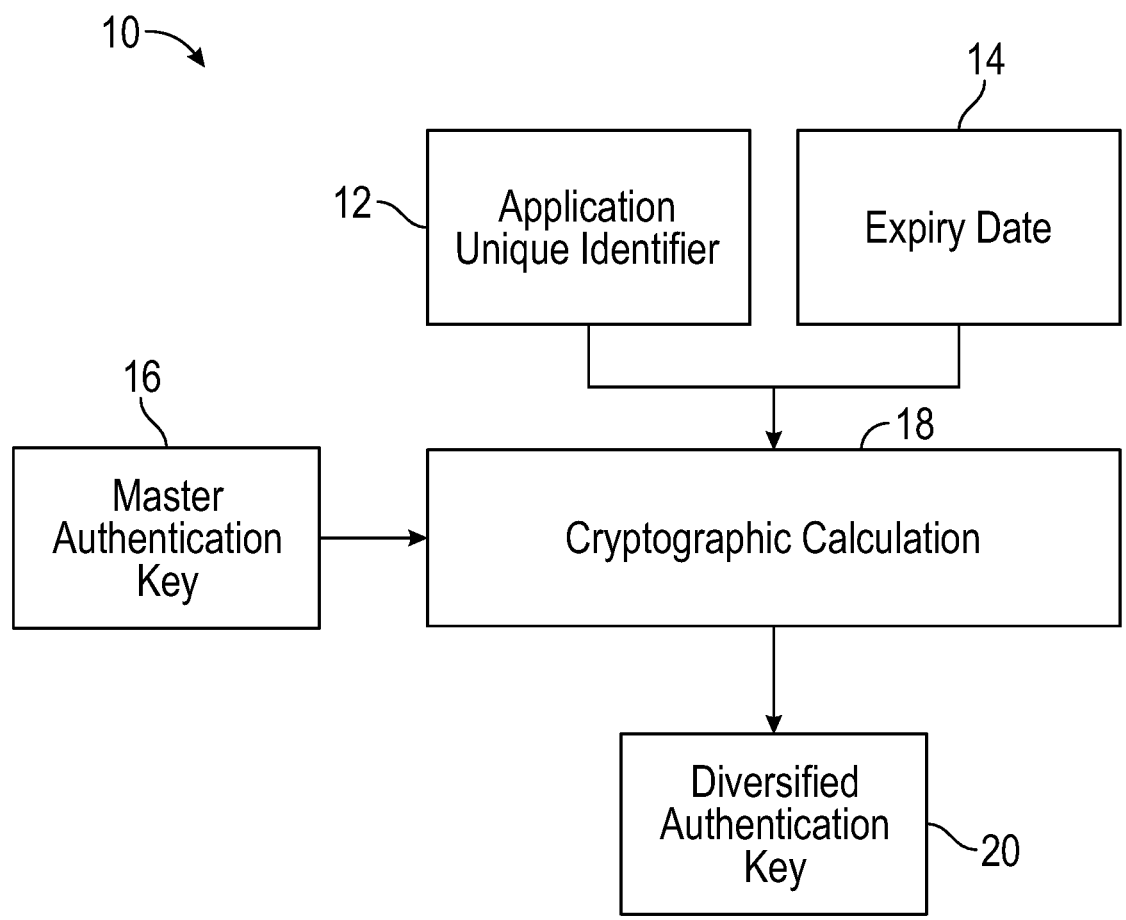
FIG. 1 illustrates a block diagram of a system for authenticating a short-range communications HCE (Host Card Emulation) application for mobile communications devices, in accordance with an example embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems/devices. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. Additionally, the term "step" can be utilized interchangeably with "instruction" or "operation." Features, components, steps, instructions or operations can be described herein with respect to blocks shown in the various diagrams.

FIG. 1 illustrates a block diagram of a system 10 for authenticating a short-range communications HCE (Host Card Emulation) application for mobile communications devices (e.g., such as the client device 22 shown in FIG. 3), in accordance with an example embodiment. In general, the system 10 depicted in FIG. 1 includes five basic components. That is, an application unique identifier 12 and an expiry date 14 can be provided to a cryptographic calculation module 18, which in turn can output a diversified authentication key 20. A master authentication key 16 is provided as input to the cryptographic calculation module 18. Thus, the system 10 shown in FIG. 1 can implement operations for an HCE application key calculation.

In general, HCE application data can be transmitted to each registered mobile communications device (e.g., such as the client device 22 shown in FIG. 3) among a group of mobile communications devices for storage of the HCE application data in a non-volatile memory associated with each registered mobile communications device. The HCE application data includes a unique identifier such as the application unique identifier 12, an expiry date such as the expiry date 14, and a diversified authentication key 20 valid only for a user of a registered mobile communications device. The authentication key 16 is diversified by the expiry date 14 and the unique identifier 12 so that the resulting diversified authentication key 20 is only usable for a limited amount of time and the unique identifier 12 is only usable for a single mobile communications device, thereby preventing the creation of a fake HCE application, and automatically limiting the life of a stolen application to the expiry date 14. The aforementioned short-range communications can be, for example, NFC (Near Field Communication), BLE (Bluetooth Low Energy) wireless communications, and so on.

In some example embodiments, a central system can be provided, which is responsible for renewing expiry dates and diversified authentication keys and also which receives one or more transactions with the same application unique identifier originating from two or more mobile communications devices among the aforementioned group of communications devices. The unique identifier is transmitted in a hot list at regular intervals to all validators. This process is further discussed and illustrated herein with respect to FIG. 2.

Figure 2:
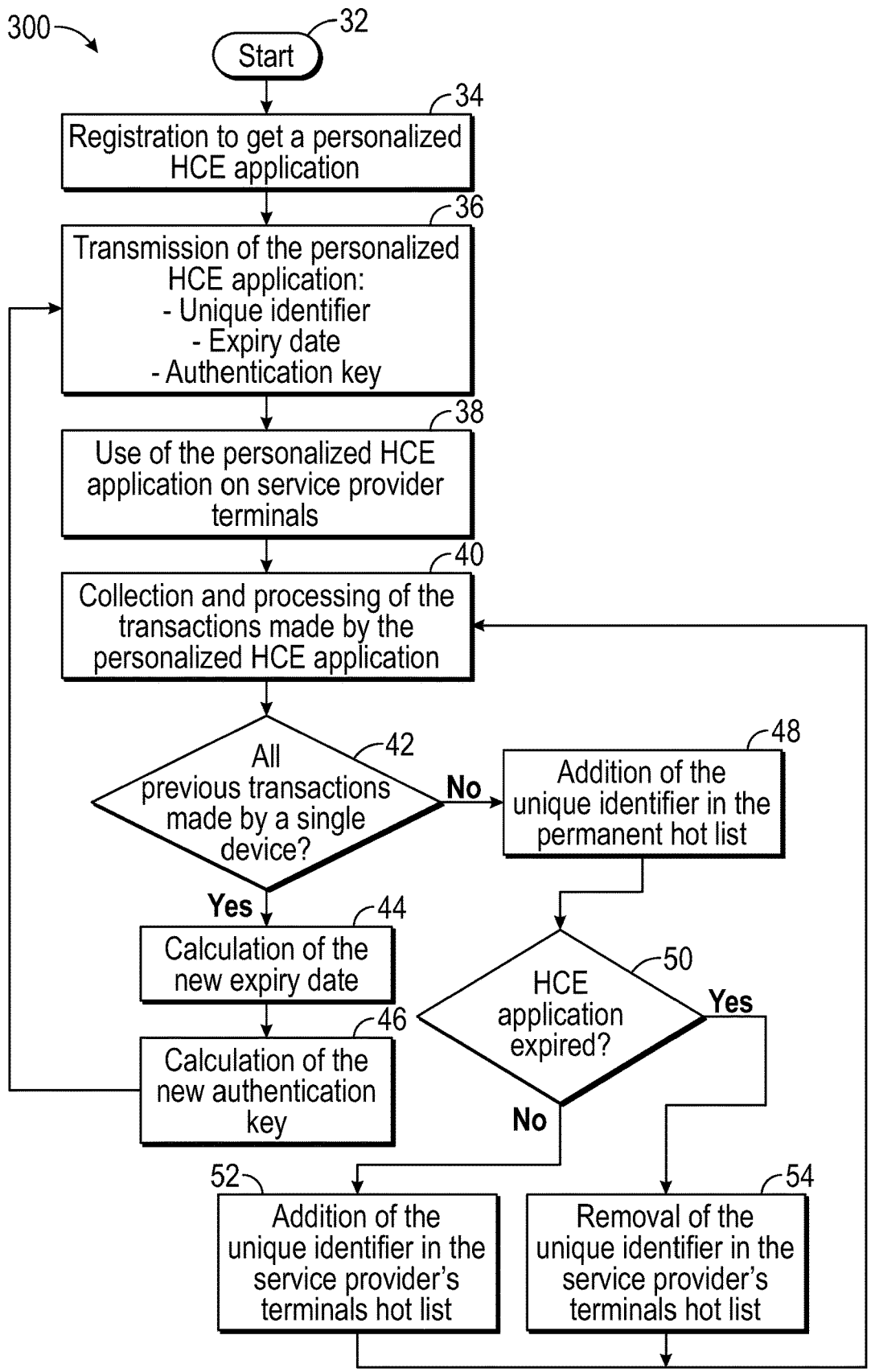
FIG. 2 illustrates a flow chart of operations depicting logical operational steps of a method for authenticating a short-range communications HCE (Host Card Emulation) application for mobile communications devices, in accordance with an example embodiment.

FIG. 2 illustrates a flow chart of operations depicting logical operational steps of an example method 300 for authenticating a short-range communications HCE (Host Card Emulation) application for mobile communications devices, in accordance with an example embodiment. The method 300 shown in FIG. 2 covers each personalized HCE application identified by its unique identifier (e.g., such as the application unique identifier 12 of FIG. 1).

As illustrated at block 32, the process begins. Then, as depicted at block 34, a step or operation can be implemented for a registration to obtain a personalized HCE application. Thereafter, as indicated at block 36, a step or operation can be implemented for the transmission of the personalized HCE application including the transmission of data such as the unique identifier 12, the expiry date 14, and the diversified authentication key 20 shown in FIG. 1. Next, as depicted at block 38, a step or operation can be implemented to provide for the use of the personalized HCE application on service provider terminals. As utilized herein, the term "service provider terminal" can refer to, for example, a point-of-sale (POS) terminal.

As shown thereafter at block 40, a step or operation can be implemented for the collection and processing of the transactions made by the personalized HCE application. Then, as depicted at decision block 42, a test can be performed to determine if all previous transactions were made by a single device (e.g., a single client device). If "yes," then as shown at block 44, a step or operation can be implemented to calculate the new expiry date 14 followed by a step or operation as indicated at block 46 to calculate the new diversified authentication key 20. The operations shown at blocks 42, 44, and 46 can be facilitated or performed by, for example, the cryptographic calculation module 18 shown in FIG. 1. Note that the operation depicted at block 46 utilizes cryptography and the operations depicted at blocks 42 and 44 involve more data processing from the transactions collected. Following processing of the operation shown in block 46, the operation depicted at block 36 can be repeated followed by the operation shown at block 38 and so on.

Assuming the result of the test shown at decision block 42 is "no," then a step or operation can be implemented, as shown at block 48, for the addition of the unique identifier in a permanent hot list. Then, as depicted at decision block 50, a test can be implemented to determine if the HCE application has expired. If the answer is "no," then the operation depicted at block 52 can be implemented, which involves the addition of the unique identifier in the service provider's terminals hot list. That is, in most cases, the HCE application should probably not be expired (i.e., addition to the hot list), then a few days later, the HCE application will be expired (i.e., removal from the hot list).

If the answer is "yes," then an operation can be implemented, as shown at block 54 for the removal of the unique identifier from the service provider's terminals hot list. Following processing of the steps or operations shown at block 52 or 54, the step/operation depicted at block 40 can be implemented followed by the operation shown at decision block 42 and so on.

Thus, in some example embodiments, a ticketing central system can send the following HCE application data to each registered user's mobile phone for storage in the phone's non-volatile memory: an HCE application unique identifier, an expiry date (typically, only a few days), and an authentication key only valid for this user. The authentication key is diversified by the HCE application unique identifier. Therefore, it can only be used for one mobile phone. This authentication key s also diversified by the expiry date; therefore, it can only be used, for example, for a few days. In this manner, it is not possible to create a fake HCE application unique identifier which would be accepted by a validator if the complete HCE application data (identifier, expiry date, and key) is stolen, and the clone using these elements will only be valid for a few days.

Additionally, if the thief tries to tamper with the expiry date then the authentication key will automatically become invalid. If the central system in charge of renewing the expiry dates and diversified authentication keys receives transactions with the same HCE application unique identifier coming from several mobile phones, it will add this HCE application unique identifier in the aforementioned hot list regularly transmitted to all validators.

Figure 3:
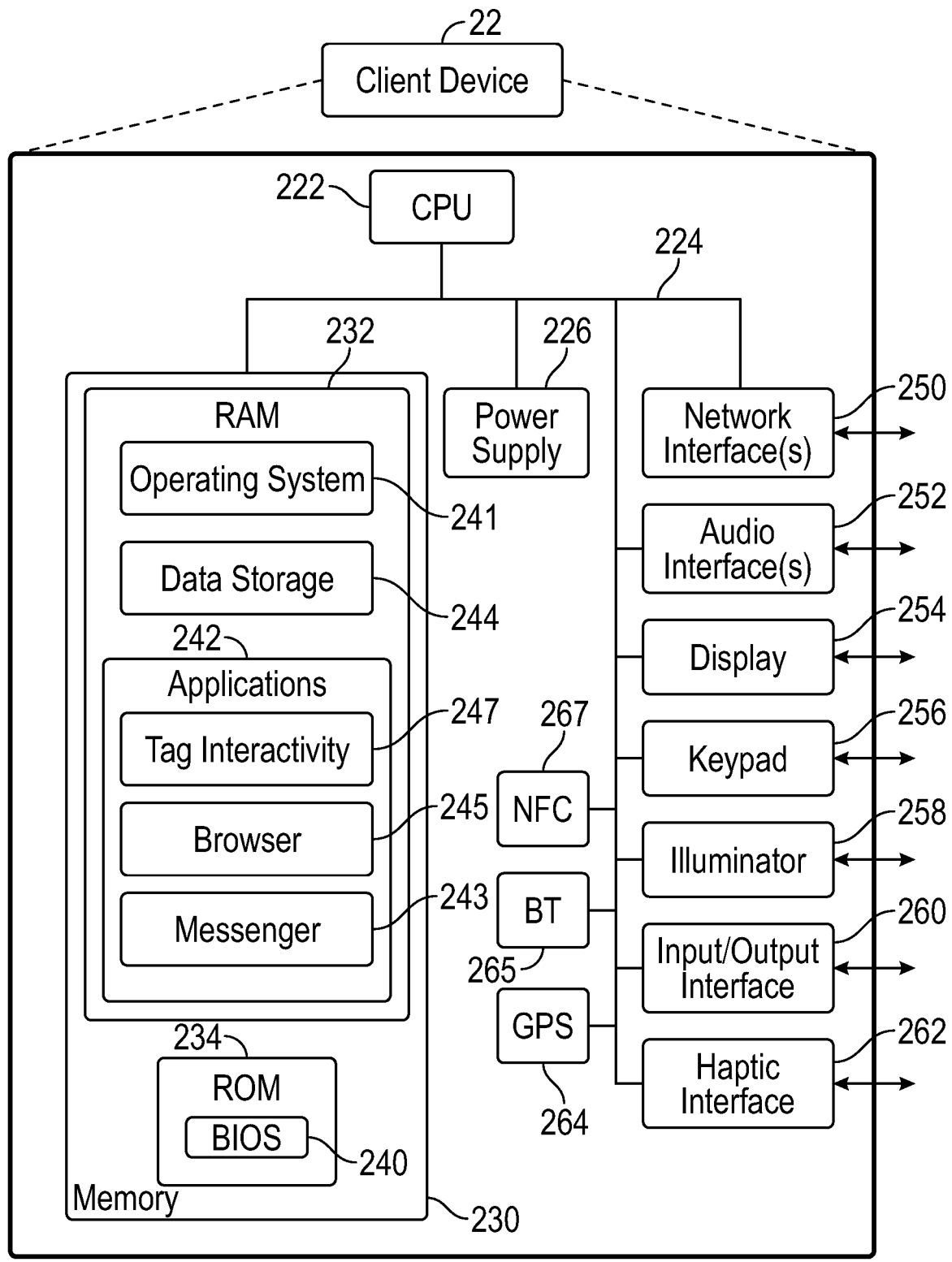
FIG. 3 illustrates a schematic diagram depicting an example of a mobile device (e.g., a client device), which can be implemented in accordance with an example embodiment.

FIG. 3 illustrates a schematic diagram depicting a client device 22 (e.g., a client device) that can be implemented in accordance with an example embodiment. The client device 22 shown in FIG. 3 can function as a computing device capable of sending or receiving signals through a wired or a wireless network. The client device 22 may be implemented as, for example, a desktop computer or a portable device, such as a cellular telephone, a smartphone, a display pager, a radio frequency (RF) device, an infrared (IR) device, a Personal Digital Assistant (PDA), a handheld computer, a tablet computer, a laptop computer, a wearable computer, or an integrated device combining various features, such as features of the foregoing devices, or the like. In a preferred example embodiment, however, it can be assumed that the client device 22 is a mobile device such as, for example, a smartphone, tablet computing device, a smart watch, or other wearable computing device.

A client device such as client device 22 may vary in terms of capabilities or features. The claimed subject matter is intended to cover a wide range of potential variations. For example, a cell phone may include a numeric keypad or a display of limited functionality, such as a monochrome liquid crystal display (LCD) for rendering text and other media. In contrast, however, as another example, a web-enabled client device may include one or more physical or virtual keyboards, mass storage, one or more accelerometers, one or more gyroscopes, global positioning system (GPS) or other location identifying type capability, or a display with a high degree of functionality, such as a touch-sensitive color 2D or 3D display, for example.

A client device such as client device 22 may include or may execute a variety of operating systems, such as operating system 241, including in some example embodiments, a personal computer operating system, such as a Windows®, iOS® or Linux®, or a mobile operating system, such as iOS®, Android®, or Windows Mobile®, or the like. A client device such as client device 22 may include or may execute a variety of possible applications, such as a client software application enabling communication with other devices, such as communicating one or more messages, such as via email, short message service (SMS), or multimedia message service (MMS), including via a network, such as an online social network, including, for example, Facebook®, LinkedIn®, Twitter®, Flickr®, Google+® to provide only a few possible examples.

A client device, such as client device 22, may also include or execute an application to communicate content, such as, for example, textual content, multimedia content, or the like. A client device may also include or execute an application to perform a variety of possible tasks, such as browsing, searching, playing various forms of content, including locally stored or streamed video, or games (e.g., fantasy sports leagues, etc.). The foregoing is provided to illustrate that claimed subject matter is intended to include a wide range of possible features or capabilities. Examples of such applications (or modules) can include a messenger 243, a browser 245, and other client application(s) or module(s) such as a tag module 247 that provides instructions for facilitating interactivity and communications between the client device 22 and the (emulated) tag 10.

The example client device 22 shown in FIG. 3 generally includes a CPU (Central Processing Unit) 222 and/or other processors (not shown) coupled electronically via a system bus 224 to memory 230, power supply 226, and a network interface 250. The memory 230 can be composed of RAM (Random Access Memory) 232 and ROM (Read Only Memory) 234. Other example components that may be included with client device 22 can include, for example, an audio interface 252, a display 254, a keypad 256, an illuminator 258, and an input/output interface 260. In some example embodiments, a haptic interface 262 and a GPS (Global Positioning System) module or unit 264 can be implemented. In addition, the client device 22 can be configured with various short-range communications capabilities such as, for example, a Bluetooth (BT) module 265 and an NFC (Near Field Communication) module 267 electronically coupled via the system bus 224 to CPU 222, memory 230, power supply 226, and so on.

The BT (Bluetooth) module 265, for example, can permit communication of client device 22 with other devices, including Bluetooth and/or BLE beacons and/or transponders as discussed herein. The near field communication (NFC) module 267 can facilitate NFC communication with other devices including, e.g., an NFC beacon. With respect to the Bluetooth module 265, it may be implemented as a Bluetooth Low Energy (BLE) module and/or a Bluetooth 4.0 module that implements communications using one or more of BLE systems, standard Bluetooth systems, and/or iBeacon systems specifically. As understood herein, BLE may operate in the same spectrum range (the 2.400 GHz-2.4835 GHz band) as classic Bluetooth technology, but may use a different set of channels. Instead of Bluetooth's seventy nine 1-MHz channels, e.g., BLE employs forty 2-MHz channels. BLE may send data within a channel using Gaussian frequency shift modulation with a one-megabyte per second data rate and a maximum transmission power of ten milliwatts (10 mW).

RAM 232 can store an operating system 241, provide for data storage 244, and the storage of applications 242 such as, for example, browser 245 and messenger 243 applications. ROM 234 can include a BIOS (Basic Input/Output System) 240, which is a program that the CPU 222 utilizes to initiate the computing system associated with client device 22. BIOS 240 can also manage data flow between operating system 241 and components such as display 254, keypad 256, and so on.

Applications 242 can thus be stored in memory 230 and may be "loaded" (i.e., transferred from, for example, memory 230 or another memory location) for execution by the client device 22. Client device 22 can receive user commands and data through, for example, the input/output interface 260. The client device 22 in accordance with instructions from operating system 241 and/or application(s) 242 may then act upon such inputs. The interface 260, in some embodiments, can serve to display results, whereupon a user may supply additional inputs or terminate a session. The software application(s) 242 can include one or more modules such as modules 243, 245, 247, and so on, which can, for example, implement instructions or operations such as those described herein (e.g., the instructions or operations shown and discussed herein with respect to FIGS. 1-2).

As can be appreciated by one skilled in the art, embodiments can be implemented in the context of a method, data processing system, or computer program product. Accordingly, embodiments may take the form of an entire hardware embodiment, an entire software embodiment, or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object-oriented programming language (e.g., Java, C++, etc.). The computer program code, however, for carrying out operations of particular embodiments may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on a remote computer, or entirely on the remote computer. In the latter scenario, the remote computer may be connected to a user's computer through a local area network (LAN) or a wide area network (WAN), wireless data network e.g., WI-FI, Wimax, 802.xx, and cellular network or the connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks. To be clear, the disclosed embodiments can be implemented in the context of, for example, a special-purpose computer or a general-purpose computer, or other programmable data processing apparatus or system. For example, in some embodiments, a data processing apparatus or system can be implemented as a combination of a special-purpose computer and a general-purpose computer.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein. Such instructions can, for example, include instructions (i.e., steps or operations) such as those depicted in FIG. 2 with respect to blocks 32 to 54.

Note that a processor (also referred to as a "processing device") may perform or otherwise carry out any of the operational steps, processing steps, computational steps, method steps, or other functionality disclosed herein, including analysis, manipulation, conversion or creation of data, or other operations on data. A processor may include a general-purpose processor, a digital signal processor (DSP), an integrated circuit, a server, other programmable logic device, or any combination thereof. A processor may be a conventional processor, microprocessor, controller, microcontroller, or state machine. A processor can also refer to a chip or part of a chip (e.g., semiconductor chip). The term "processor" may refer to one, two, or more processors of the same or different types. It is noted that a computer, computing device and user device, and the like, may refer to devices that include a processor, or may be equivalent to the processor itself.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
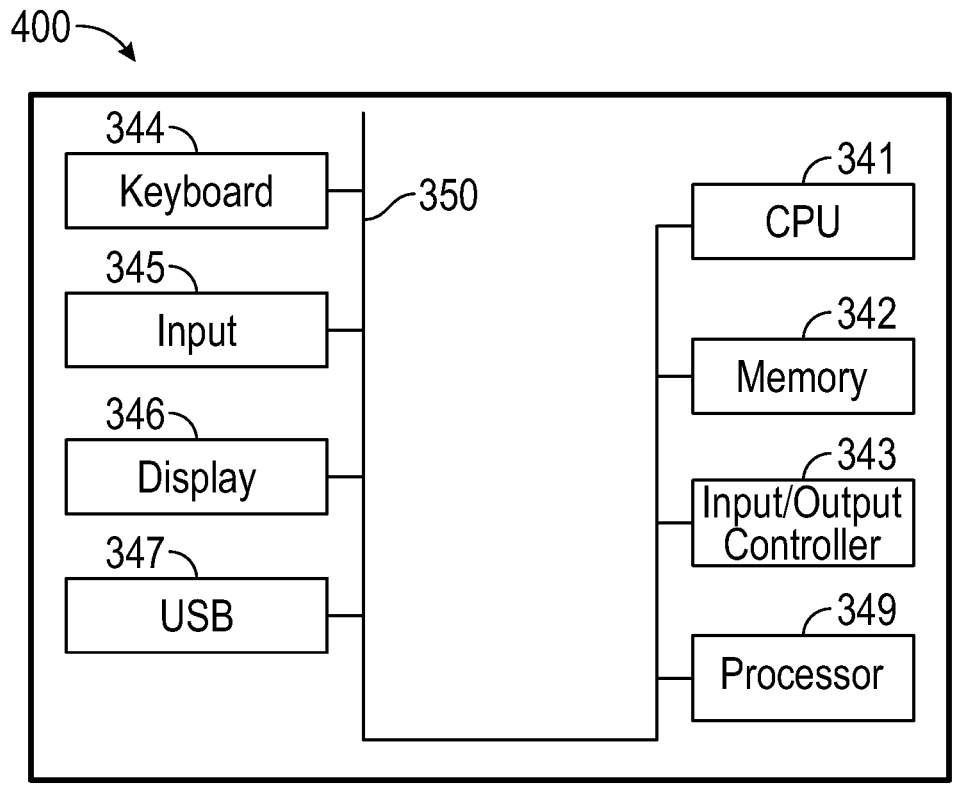
FIG. 4 illustrates a schematic view of a computer system/apparatus, in accordance with an embodiment.
Figure 5:
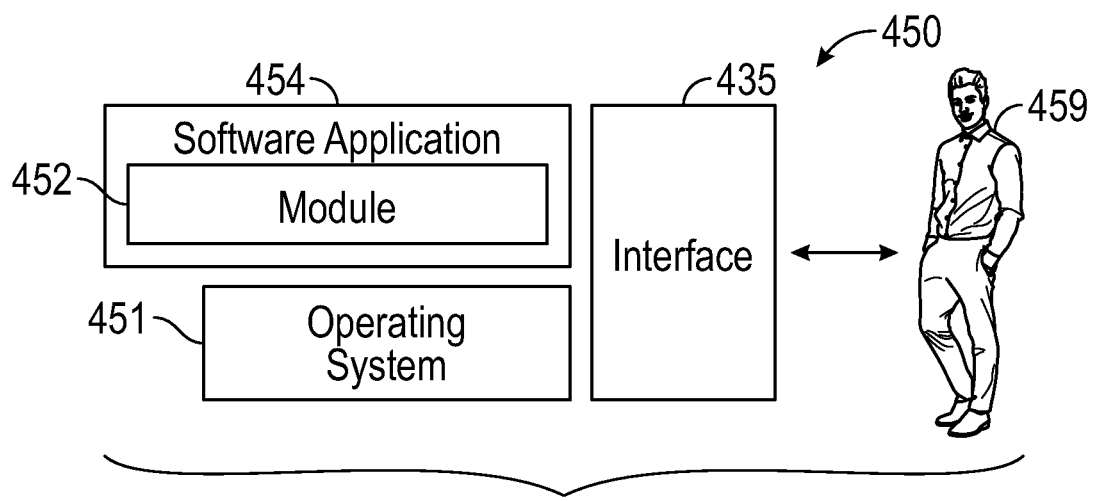
FIG. 5 illustrates a schematic view of a software system including a module, an operating system, and a user interface, in accordance with an embodiment.

FIGS. 4-5 are shown only as exemplary diagrams of data-processing environments in which example embodiments may be implemented. It should be appreciated that FIGS. 4-5 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 4, some embodiments may be implemented in the context of a data-processing system/apparatus 400 that can include, for example, one or more processors such as a processor 341 (e.g., a CPU (Central Processing Unit) and/or other microprocessors), a memory 342, an input/output controller 343, a processor 349, a peripheral USB (Universal Serial Bus) connection 347, a keyboard 344 and/or another input device 345 (e.g., a pointing device, such as a mouse, track ball, pen device, etc.), a display 346 (e.g., a monitor, touch screen display, etc.), and/or other peripheral connections and components.

As illustrated, the various components of data-processing system/apparatus 400 can communicate electronically through a system bus 350 or similar architecture. The system bus 350 may be, for example, a subsystem that transfers data between, for example, computer components within data-processing system/apparatus 400 or to and from other data-processing devices, components, computers, etc. The data-processing system/apparatus 400 may be implemented in some embodiments as, for example, a server in a client-server based network (e.g., the Internet) or in the context of a client and a server (i.e., where aspects are practiced on the client and the server).

In some example embodiments, data-processing system/apparatus 400 may be, for example, a standalone desktop computer, a laptop computer, a smartphone, a pad computing device and so on, wherein each such device is operably connected to and/or in communication with a client-server based network or other types of networks (e.g., cellular networks, Wi-Fi, etc.).

FIG. 5 illustrates an example computer software system/apparatus 450 for directing the operation of the data-processing system/apparatus 400 depicted in FIG. 4. Software application 454, stored for example in memory 342, generally includes a module 452. The example system/apparatus 450 can further include a kernel or operating system 451 and a shell or interface 435. One or more application programs, such as software application 454, may be "loaded" (i.e., transferred from, for example, mass storage or another memory location into the memory 342) for execution by the data-processing system/apparatus 400. The data-processing system/apparatus 400 can receive user commands and data through the interface 435; these inputs may then be acted upon by the data-processing system/apparatus 400 in accordance with instructions from operating system 451 and/or software application 454. The interface 435 in some embodiments can serve to display results, whereupon a user 459 may supply additional inputs or terminate a session. The software application 454 can include module(s) 452, which can, for example, implement the various instructions or operations such as those discussed herein with respect to FIGS. 1-2 and elsewhere herein. Module 452 may also be composed of a group of modules or sub-modules that implement particular modules, such as, for example, the various modules (and components/features, etc.) discussed and illustrated herein with respect to FIGS. 1-2.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" can constitute a software application, but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implement a particular data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc. In other embodiments, a module may refer to a hardware component or a combination of hardware and software.

FIGS. 4-5 are thus intended as examples and not as architectural limitations of the disclosed embodiments. Additionally, such example embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, such as but not limited to Macintosh, UNIX, LINUX, and so on.

Based on the foregoing, it can be appreciated that a number of example embodiments are disclosed herein. In one example embodiment, a method for authenticating a short-range communications HCE (Host Card Emulation) application for mobile communications devices can be implemented. Such a method can include steps or operation such as, for example, transmitting HCE application data to each registered mobile communications device among a group or plurality of mobile communications devices for storage of the HCE application data in a non-volatile memory associated with each registered mobile communications device, the HCE application data including a unique identifier, an expiry date, and an authentication key valid only for a user of each registered mobile communications device; and diversifying the authentication key by the expiry date and the unique identifier so that the authentication key is only usable for a limited amount of time and the unique identifier is only usable for a single mobile communications device, thereby preventing a creation of a fake HCE application, and automatically limiting the life of a stolen application to the expiry date.

In some example embodiments, the aforementioned short-range communications can comprise NFC (Near Field Communication). In other example embodiments, the short-range communications can comprise BLE (Bluetooth Low Energy) wireless communications. In yet other example embodiments, the short-range communications can comprise NFC (Near Field Communication) and/or BLE (Bluetooth Low Energy) wireless communications.

In yet another example embodiment, a step or operation can be implemented wherein if a central system responsible for renewing expiry dates and diversified authentication keys receives at least one transaction with a same application unique identifier originating from at least two mobile communications devices among the plurality of communications devices, the unique identifier can be transmitted in a hot list to all validators (from among a plurality or a group of validators).

In still other example embodiments, each registered mobile communications device among the group or plurality of mobile communications devices can be, for example, a smartphone, a tablet computing device, a laptop computer, a wearable computing device, etc.

In another example embodiment, the at least two mobile communications devices among the plurality of communications devices can be, for example, one or more of a smartphone, a tablet computing device, a laptop computer, a wearable computing device, etc.

In another example embodiment, a system for authenticating a short-range communications HCE (Host Card Emulation) application for mobile communications devices can be implemented. Such a system can include at least one processor and a memory communicatively coupled to the at least one processor. The memory stores instructions that, when executed by the at least one processor, configure the system to: transmit HCE application data to each registered mobile communications device among a plurality of mobile communications devices for storage of the HCE application data in a non-volatile memory associated with each registered mobile communications device, the HCE application data including a unique identifier, an expiry date, and an authentication key valid only for a user of each registered mobile communications device; and diversify the authentication key by the expiry date and the unique identifier so that the authentication key is only usable for a limited amount of time and the unique identifier is only usable for a single mobile communications device, thereby preventing a creation of a fake HCE application, and automatically limiting the life of a stolen application to the expiry date.

In yet another example embodiment, a computer program product for authenticating a short-range communications HCE (Host Card Emulation) application for mobile communications devices can be implemented. Such an example computer program product can include: a non-transitory computer readable storage medium having computer readable program code embodied therewith. The computer readable program code can include: computer readable program code configured to: transmit HCE application data to each registered mobile communications device among a plurality of mobile communications devices for storage of the HCE application data in a non-volatile memory associated with each registered mobile communications device, the HCE application data including a unique identifier, an expiry date, and an authentication key valid only for a user of each registered mobile communications device; and computer readable program code configured to: diversify the authentication key by the expiry date and the unique identifier so that the authentication key is only usable for a limited amount of time and the unique identifier is only usable for a single mobile communications device, thereby preventing a creation of a fake HCE application, and automatically limiting the life of a stolen application to the expiry date.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for authenticating a short-range communications HCE (Host Card Emulation) application for mobile communications devices, said method comprising:
   transmitting, from a computer, HCE application data to each registered mobile communications device among a plurality of registered mobile communications devices for storage of said HCE application data in a non-volatile memory associated with said each registered mobile communications device;
   storing, with the computer, said HCE application data in the non-volatile memory associated with said each registered mobile communications device, said HCE application data including a unique identifier, an expiry date, and an authentication key valid only for a user of said each registered mobile communications device;
   providing the unique identifier and the expiry date to a cryptographic calculation module;
   diversifying, with the cryptographic calculation module by the computer, said authentication key by said expiry date and said unique identifier using a cryptographic calculation by the cryptographic calculation module so that said authentication key is only usable for a limited amount of time and said unique identifier is only usable for a single mobile communications device, thereby preventing with the computer, a creation of a fake HCE application and automatically limiting the life of a stolen application by said diversifying of said authentication key by said expiry date and said unique identifier after the cryptographic calculation by the cryptographic calculation module;
   determining, by the computer, an attempt is made to tamper with the expiry date;

automatically invalidating, by the computer, the authentication key in response to determining the attempt is made to tamper with the expiry date;

transmitting, with the computer, said unique identifier in a hot list at intervals to all validators among a plurality of validators, wherein said transmitting is performed in response to a central system responsible for renewing expiry dates and diversified authentication keys receiving at least one transaction with the same application unique identifier originating from at least two mobile communications devices among said plurality of communications devices; and reading and authenticating, by at least one validator among the plurality of validators, the unique identifier associated with the HCE application data to facilitate post billing by the central system at an end of a time period.

2. The method of claim 1 wherein said short-range communications comprises NFC (Near Field Communication).

3. The method of claim 1 wherein said short-range communications comprises BLE (Bluetooth Low Energy) wireless communications.

4. The method of claim 1 wherein said short-range communications comprises NFC (Near Field Communication) or BLE (Bluetooth Low Energy) wireless communications.

5. The method of claim 1 further comprising collecting and processing with a computer transaction made by the HCE application.

6. The method of claim 5 further comprising performing a test with the computer, to determine if all transactions made previously by the HCE application were made by a single client device.

7. A system for authenticating a short-range communications HCE (Host Card Emulation) application for mobile communications devices, said system comprising:
at least one validator among a plurality of validators;
at least one processor;
memory communicatively coupled to said at least one processor, the memory storing instructions that, when executed by said at least one processor, configure said system to:
transmit HCE application data to each registered mobile communications device among a plurality of mobile communications devices for storage of said HCE application data in a non-volatile memory associated with said each registered mobile communications device;
store said HCE application data in the non-volatile memory associated with said each registered mobile communications device, said HCE application data including a unique identifier, an expiry date, and an authentication key valid only for a user of said each registered mobile communications device;
provide the unique identifier and the expiry date to a cryptographic calculation module;
diversify said authentication key with the cryptographic calculation module by said expiry date and said unique identifier so that said authentication key is only usable for a limited amount of time and said unique identifier after a cryptographic calculation by the cryptographic calculation module is only usable for a single mobile communications device, thereby preventing a creation of a fake HCE application and automatically limiting the life of a stolen application by said diversification of said authentication key by said expiry date and said unique identifier after the cryptographic calculation by the cryptographic calculation module;
determine an attempt is made to tamper with the expiry date;
automatically invalidate the authentication key when the attempt is made to tamper with the expiry date; and
transmit said unique identifier in a hot list at intervals to all validators among the plurality of validators, wherein said transmit is performed in response to a central system responsible for renewing expiry dates and diversified authentication keys receiving at least one transaction with the same application unique identifier originating from at least two mobile communications devices among said plurality of communications devices;
wherein the at least one validator among the plurality of validators is configured to read and authenticate the unique identifier associated with the HCE application data to facilitate post billing by the central system at an end of a time period.

8. The system of claim 7 wherein said short-range communications comprises NFC (Near Field Communication).

9. The system of claim 7 wherein said short-range communications comprises BLE (Bluetooth Low Energy) wireless communications.

10. The system of claim 7 wherein said short-range communications comprises NFC (Near Field Communication) or BLE (Bluetooth Low Energy) wireless communications.

11. The system of claim 7 wherein the instructions further configure the system to collect and process transactions made by the HCE application.

12. The system of claim 7 wherein the instructions further configure the system to perform a test to determine if all transactions made previously by the HCE application were made by a single client device.

13. A computer program product for authenticating a short-range communications HCE (Host Card Emulation) application for mobile communications devices, said computer program product comprising: a non-transitory computer readable storage medium having computer readable program code embodied therewith that, when executed by a computing system comprising a computer and at least one validator of a plurality of validators, causes the computing system to perform the following method steps:
transmitting, from the computer, HCE application data to each registered mobile communications device among a plurality of registered mobile communications devices for storage of said HCE application data in a non-volatile memory associated with said each registered mobile communications device;
storing, with the computer, said HCE application data in the non-volatile memory associated with said each registered mobile communications device, said HCE application data including a unique identifier, an expiry date, and an authentication key valid only for a user of said each registered mobile communications device;
providing the unique identifier and the expiry date to a cryptographic calculation module;
diversifying, with the cryptographic calculation module by the computer, said authentication key by said expiry date and said unique identifier using a cryptographic calculation by the cryptographic calculation module so that said authentication key is only usable for a limited amount of time and said unique identifier is only usable for a single mobile communications device, thereby preventing with the computer, a creation of a fake HCE application and automatically limiting the life of a stolen application by said diversifying of said authentication key by said expiry date and said unique identifier after the cryptographic calculation by the cryptographic calculation module;

determining, by the computer, an attempt is made to tamper with the expiry date;

automatically invalidating, by the computer, the authentication key in response to determining the attempt is made to tamper with the expiry date;

transmitting, with the computer, said unique identifier in a hot list at intervals to all validators among a plurality of validators, wherein said transmitting is performed in response to a central system responsible for renewing expiry dates and diversified authentication keys receiving at least one transaction with the same application unique identifier originating from at least two mobile communications devices among said plurality of communications devices; and reading and authenticating, by the at least one validator of the plurality of validators, the unique identifier associated with the HCE application data to facilitate post billing by the central system at an end of a time period.

14. The computer program product of claim 13 wherein said short-range communications comprises NFC (Near Field Communication).

15. The computer program product of claim 13 wherein said short-range communications comprises BLE (Bluetooth Low Energy) wireless communications.

16. The computer program product of claim 13 wherein said short-range communications comprises NFC (Near Field Communication) or BLE (Bluetooth Low Energy) wireless communications.

17. The computer program product of claim 13 wherein the computer readable program code is further configured to:
collect and process transactions made by the HCE application; and
perform a test to determine if all transactions made previously by the HCE application were made by a single client device.

* * * * *